US011924541B2

(12) United States Patent
Kocienda et al.

(10) Patent No.: US 11,924,541 B2
(45) Date of Patent: Mar. 5, 2024

(54) AUTOMATIC CAMERA EXPOSURES FOR USE WITH WEARABLE MULTIMEDIA DEVICES

(71) Applicant: Humane, Inc., San Francisco, CA (US)

(72) Inventors: Kenneth Luke Kocienda, San Francisco, CA (US); Imran A. Chaudhri, Mill Valley, CA (US)

(73) Assignee: Humane, Inc., San Francisco, CA (US)

( * ) Notice: Subject to any disclaimer, the term of this patent is extended or adjusted under 35 U.S.C. 154(b) by 0 days.

(21) Appl. No.: 17/687,571

(22) Filed: Mar. 4, 2022

(65) Prior Publication Data

US 2023/0283886 A1    Sep. 7, 2023

(51) Int. Cl.
*H04N 23/60* (2023.01)
*G06V 20/40* (2022.01)
*H04N 23/67* (2023.01)
*G06V 40/10* (2022.01)

(52) U.S. Cl.
CPC ............. *H04N 23/64* (2023.01); *G06V 20/46* (2022.01); *H04N 23/67* (2023.01); *G06V 40/10* (2022.01)

(58) Field of Classification Search
CPC .................................................. H04N 5/23222
USPC ....................................................... 348/222.1
See application file for complete search history.

(56) References Cited

U.S. PATENT DOCUMENTS

2019/0052797 A1* 2/2019 Taoki ................. H04N 5/23245

OTHER PUBLICATIONS

International Search Report and Written Opinion in International Appln. No. PCT/US2023/014529, dated Apr. 20, 2023, 7 pages.
Kanel, "Sixth Sense Technology," Thesis for the Bachelor Degree of Engineering in Information and Technology, Centria Univeristy of Applied Sciences, May 2014, 46 pages.
Mann et al., "Telepointer: Hands-Free Completely Self Contained Wearable Visual Augmented Reality without Headwear and without any Infrastructural Reliance", IEEE International Symposium on Wearable Computing, 2000, 4 pages.
Mann, "Wearable Computing: A First Step Toward Personal Imaging," IEEE Computer, Feb. 1997, 30(2):25-32.
Mann, "Wearable, tetherless computer-mediated reality," In Presentation at the American Association of Artificial Intelligence, Feb. 1996, 8 pages.

(Continued)

*Primary Examiner* — Joel W Fosselman
(74) *Attorney, Agent, or Firm* — Fish & Richardson P.C.

(57) ABSTRACT

Systems, methods, devices and non-transitory, computer-readable storage mediums are disclosed for a wearable multimedia device and cloud computing platform with an application ecosystem for processing data captured by the wearable multimedia device. In an embodiment, operations performed by the wearable multimedia device or cloud computing platform include accessing information from one or more data streams, where the one or more data streams include at least one of image data or preset image parameters; determining, using the information from the one or more data streams, exposure parameters for capturing one or more images; applying the determined exposure parameters to a camera; and controlling the camera to capture one or more images with an exposure set according to the applied exposure parameters.

21 Claims, 12 Drawing Sheets

(56) References Cited

OTHER PUBLICATIONS

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>.

Mistry et al., "WUW—wear Ur world: a wearable gestural interface", Proceedings of CHI EA '09, Extended Abstracts on Human Factors in Computing Systems, ACM New York, NY, USA, 5 pages.

Shetty et al., "Sixth Sense Technology," International Journal of Science and Research, Dec. 2014, 3(12):1068-1073.

* cited by examiner

| Streams | Users | Userdevices | Devices |
|---|---|---|---|
| streamid | userid | userid | deviceid |
| deviceid | deviceid | deviceid | started |
| start | email | | state |
| end | fname | | modified |
| lat | lname | | created |
| lon | | | |
| attributes | | | |
| entities | | | |

| ProcessingResults | Entities | EntityTypes | EntityAssociations |
|---|---|---|---|
| streamid | entityID | person | entity 1 |
| ai | userid | place | entity 2 |
| result | entityName | thing | |
| callback | entityType | event | |
| duration | entityAttribute | | |
| accuracy | | | |

FIG. 5

AUTOMATIC CAMERA EXPOSURES FOR USE WITH WEARABLE MULTIMEDIA DEVICES

TECHNICAL FIELD

This disclosure relates generally to wearable multimedia devices, and in particular to using camera functionalities with wearable multimedia devices.

BACKGROUND

Wearable devices have been developed to capture images of a scene while worn by a user. Wearable devices can include cameras configured with one or more sensors to convert light to one or more data values. The data values can represent a scene with one or more objects or subjects.

SUMMARY

Systems, methods, devices and non-transitory, computer-readable storage media are disclosed for automatically determining exposures of an image capture device based on exposure parameters determined from obtained data. In some implementations, the image capture device is a component of a mobile device, e.g., a camera component in a wearable multimedia device. The obtained data can include data from sensors onboard the multimedia device, or data obtained from a network server, or both.

In some implementations, a user interacts with images generated from one or more exposures of the image capture device, such as a camera, or controls operation of the image capture device, or both, using a laser projected virtual interface (VI), such as high-precision laser scanners (e.g., MEMS scanners) that can turn any surface into a VI. For example, a laser projected VI can be projected onto the palm of a user's hand or other surface. Three-dimensional (3D) depth sensors (e.g., a time of flight (TOF) camera) can be used to detect user gestures that are interacting with one or more VI elements projected on the surface.

In general, a wearable multimedia device can include a projector subsystem configured to present information visually to a user in the form of projected light. For example, the projector subsystem can project light onto a surface (e.g., a surface of a user's hand, such as the user's palm) according to a particular spatial and/or temporal pattern, such that the user perceives a VI with one or more user interface elements. Further, the user can perform gestures to interact with the VI.

In some implementations, a wearable multimedia device can present a camera interface that allows a user to view or interact with obtained images as well as capture an image or indicate, with a predetermined gesture, an intent to start image captures. This VI is also be referred to as a camera interface.

In some implementations, a wearable multimedia device includes an exposure engine that generates one or more exposure parameters for a component camera of the multimedia device. For example, the exposure engine can obtain data from one or more of onboard sensors or connected components including connected network servers. The exposure engine can process the data to determine one or more exposure parameters. Depending on implementation, the exposure engine can process the data using one or more of: an offline trained machine learning model (also referred to simply as a model), a trained model that is network accessible in a cloud computing architecture, offline or cloud-based program algorithms, as well as any combination or number of offline trained models, trained models in a cloud computing architecture, and offline or cloud-based program algorithms.

The implementations described herein can provide various technical benefits. For instance, a system including the exposure engine can reduce storage requirements of a wearable device while increasing the quality of images and the ability for a user to automatically capture, in a high-quality image, noteworthy or interesting events or objects. The system can reduce storage requirements by automatically controlling the timing of exposures to coincide with likely noteworthy or interesting events, such as a target object momentarily coming into field of view, or sudden changes or motion within a frame of exposure. In this way, the system can reduce a total number of image captures. The system can reduce storage requirements by storing only images determined to be high-quality, or generated high-quality images, and removing, or not storing, low quality images.

The system can reduce processing power requirements of a wearable device. For example, by reducing the quantity of images captured during exposures to only those images that represent objects or persons of interest as well as noteworthy or interesting events, the system can reduce processing power that would have been otherwise used for processing a larger set of images had the exposures not been controlled to reduce image captures in periods that do not likely include interesting or noteworthy events. This also saves the user time that would be spent with traditional image capturing devices, to review captured images and manually select some of the images to be saved, while removing or deleting the rest.

In some implementations, the exposure engine provides images to a model trained to determine the quality of an image. For example, a model can be trained using training data indicating images marked by a user or algorithm as high-quality, such as images that are in focus, feature persons prominently, have subjects in focus, provide natural lighting and coloring, among others, and images marked by a user or algorithm as low quality, such as images that are not in focus, have poor focus, color, or lighting, among others. The model can also be trained based on a user's selection of images. The model can be trained to generate images with similar features compared to a selection of images selected by the user, a trained model, or algorithm.

One innovative aspect of the subject matter described in this specification is embodied in a method that includes accessing, at a wearable device, information from one or more data streams, where the one or more data streams include at least one of image data or preset image parameters available to the wearable device; determining, using the information from the one or more data streams, exposure parameters for capturing one or more images; applying the determined exposure parameters to a camera associated with the wearable device; and controlling the camera to capture one or more images with an exposure set according to the applied exposure parameters.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include accessing the information from the one or more data streams in response to: receiving an input to take pictures using the camera; or predicting, based on context of the wearable device determined using one or more sensors, that the camera will be activated to take pictures.

In some implementations, determining the exposure parameters includes adjusting the preset image parameters based on a target feature determined from the one or more data streams.

In some implementations, the preset image parameters are generated based on at least one of context of the wearable device determined using one or more sensors, calendar information, or location information.

In some implementations, actions include identifying a feature within the one or more data streams; and detecting the feature within the image data of the one or more data streams.

In some implementations, the feature includes at least one of a representation of a specific person or a representation of a specific object.

In some implementations, actions include controlling the camera to adjust one or more lenses to focus on the feature.

In some implementations, actions include controlling the camera to capture the feature within the one or more images.

In some implementations, actions include controlling the camera to capture the feature within one or more additional images with the exposure set according to an adjusted version of the applied exposure parameters.

In some implementations, the one or more data streams include at least one of calendar information, location information, or stored image data.

The details of the disclosed embodiments are set forth in the accompanying drawings and the description below. Other features, objects and advantages are apparent from the description, drawings and claims.

DESCRIPTION OF DRAWINGS

FIG. 5 illustrates data objects used by the data processing system of FIG. 2, according to an embodiment.

The same reference symbol used in various drawings indicates like elements.

DETAILED DESCRIPTION

Example Wearable Multimedia Device

Figure 1:
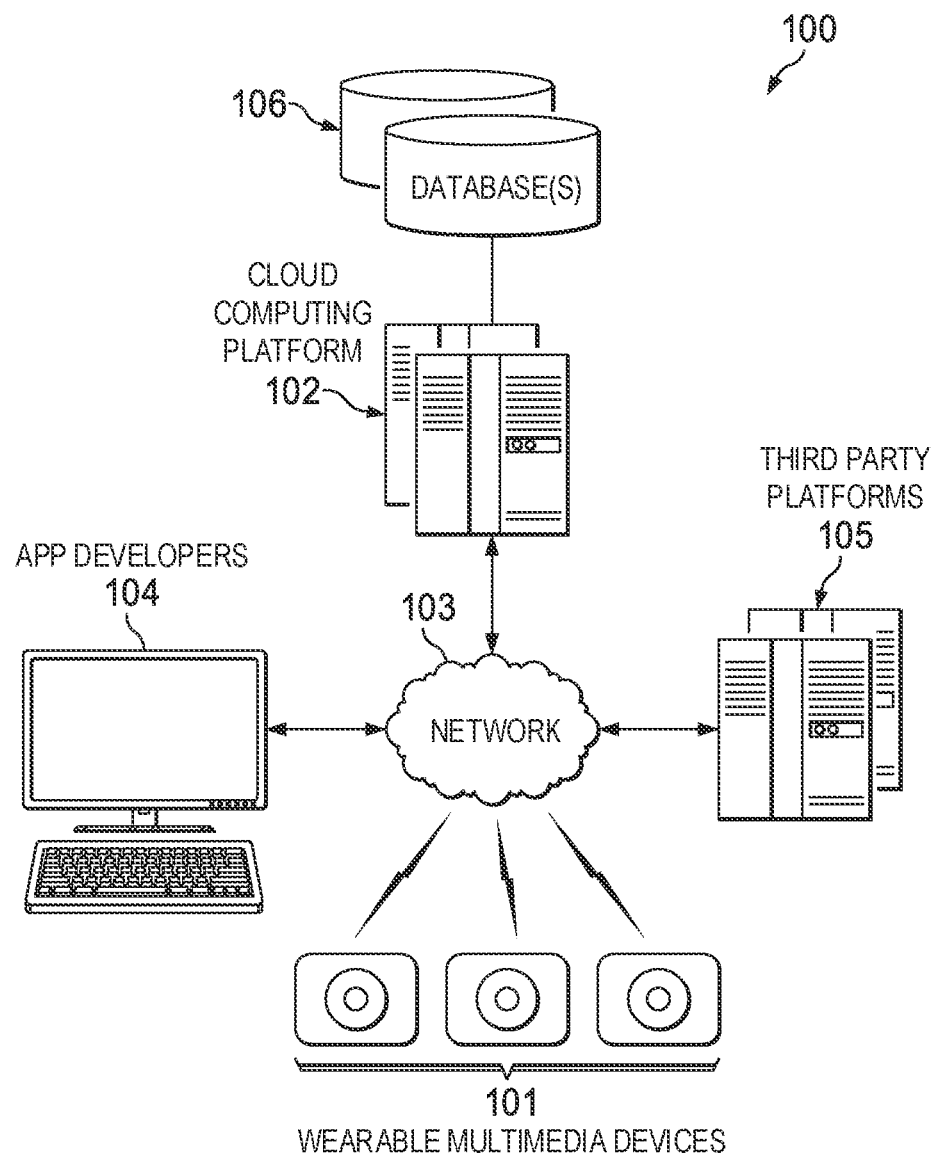
FIG. 1 is a block diagram of an operating environment for a wearable multimedia device and cloud computing platform with an application ecosystem for processing multimedia data captured by the wearable multimedia device, according to an embodiment

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up. The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, or image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including Wi-Fi, 3G, 4G and 5G communication technologies. In an embodiment, the headset or earbuds also include sensors (e.g., biometric sensors, inertial sensors) that provide information about the direction the user is facing, to provide commands with head gestures or playback of spatial audio, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector) or other digital projection technology (e.g., Liquid Crystal on Silicon (LCoS or LCOS), Digital Light Processing (DLP) or Liquid Chrystal Display (LCD) technology), or can be wired or wirelessly coupled to an external projector, that allows the user to replay a moment on a surface such as a wall or table top or on a surface of the user's hand (e.g., the user's palm). In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured and optionally cropped (e.g., to protect privacy) and sent to the cloud computing platform where an image recognition application can run an image query and store or return the results to the user. Air and touch gestures can also be performed on a projected ephemeral display, for example, responding to user interface elements projected on a surface.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allow various third party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the wearable multimedia device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) in between. In an embodiment, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document every day transactions (e.g., financial transactions) with minimal user interaction or device set-up. The context data captured by wireless multimedia devices 101 are uploaded to cloud computing platform 102. Cloud computing platform 102 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., Wi-Fi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
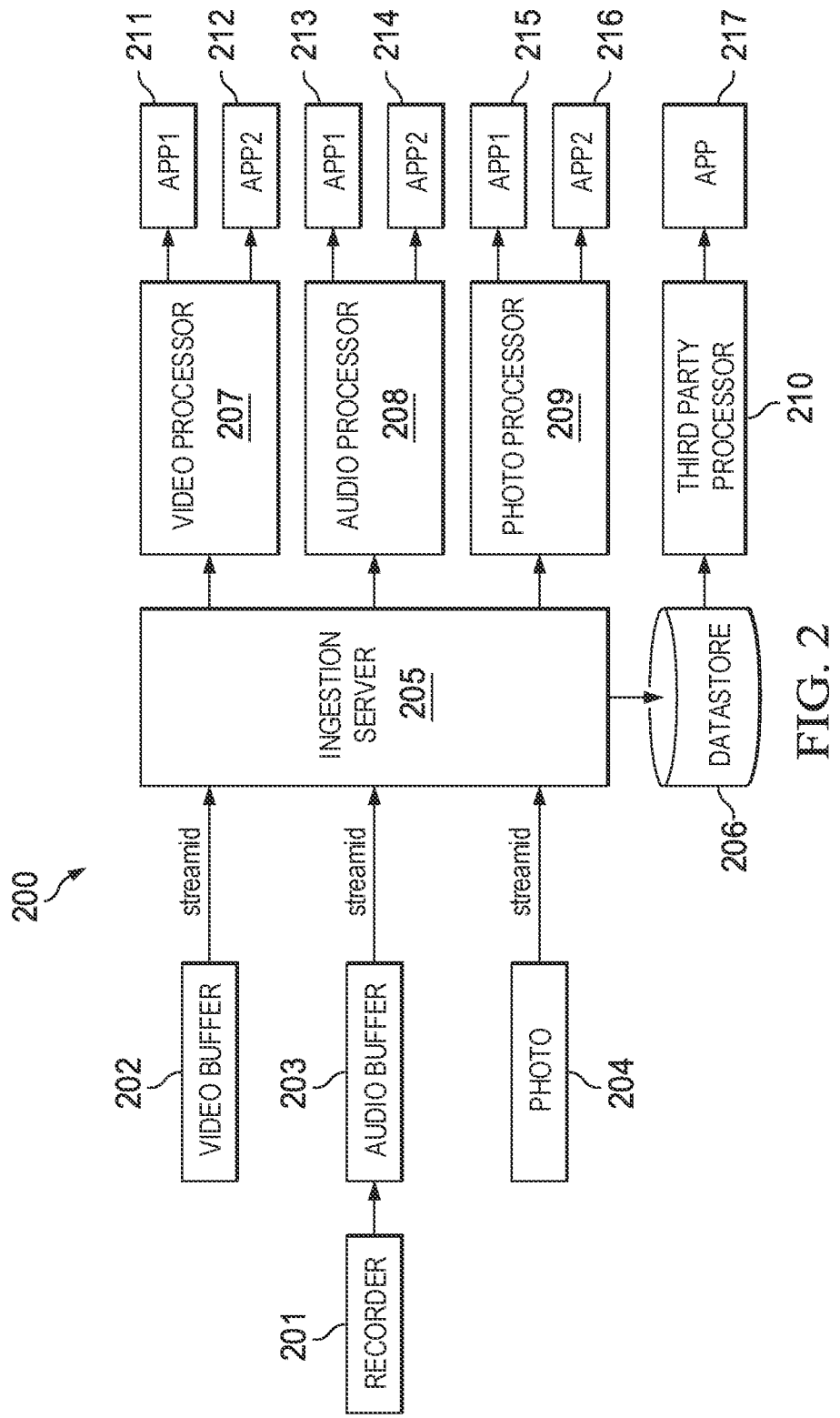
FIG. 2 is a block diagram of a data processing system implemented by the cloud computing platform of FIG. 1, according to an embodiment.

FIG. 2 is a block diagram of a data processing system implemented by the wearable multimedia device and the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may include the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, third party processor 210 can process one or more of the streams using its own processor and application 217. In another example, audio processor 208 can be an audio processing server that sends speech data stored in audio buffer 203 to speech-to-text converter applications 213, 214. In another example, photo processor 209 can be an image processing server that sends image data stored in photo buffer 204 to image processing applications 215, 216.

Example Scene Identification Application

Figure 3:
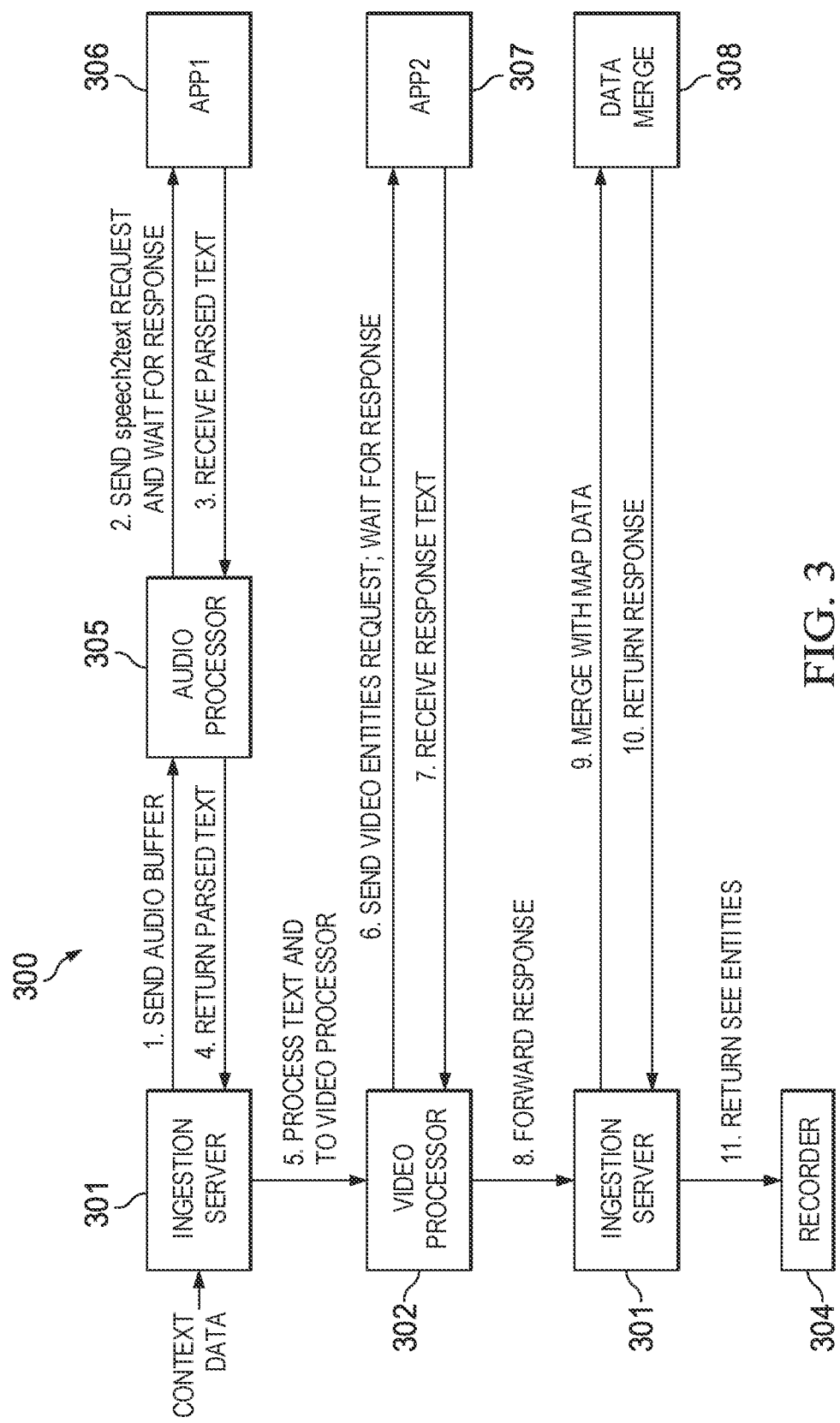
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a requests to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, Calif." can be returned as "Home." The ontology can be specific to the user and can grow and learn from the user's input.

Example Transportation Application

Figure 4:
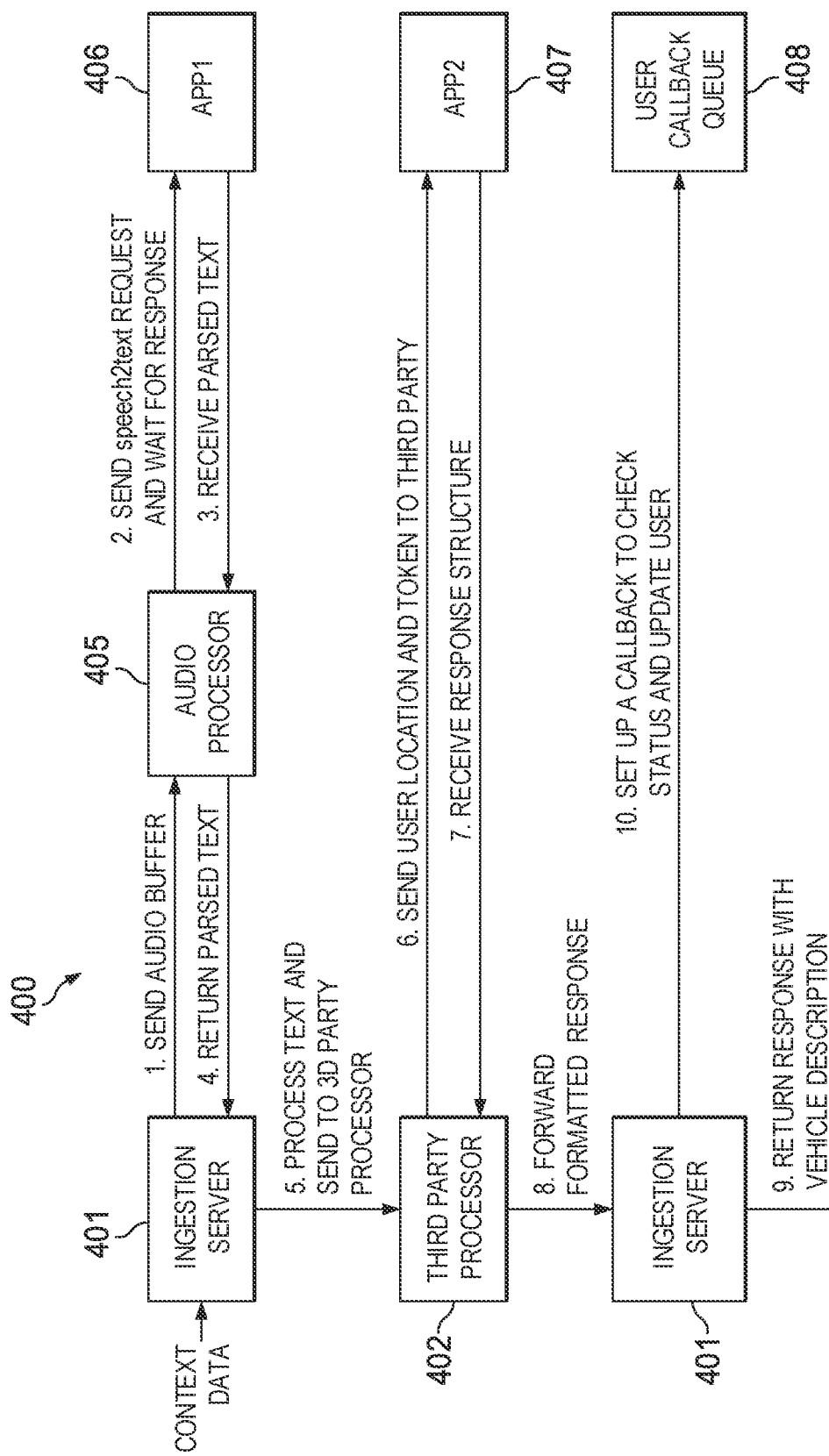
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™® application). In an embodiment, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In an embodiment, streamid is each user stream as a Universally Unique Identifier (UUID). For example, a stream that was started from 8:00 AM to 10:00 AM will have id:15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In an embodiment, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
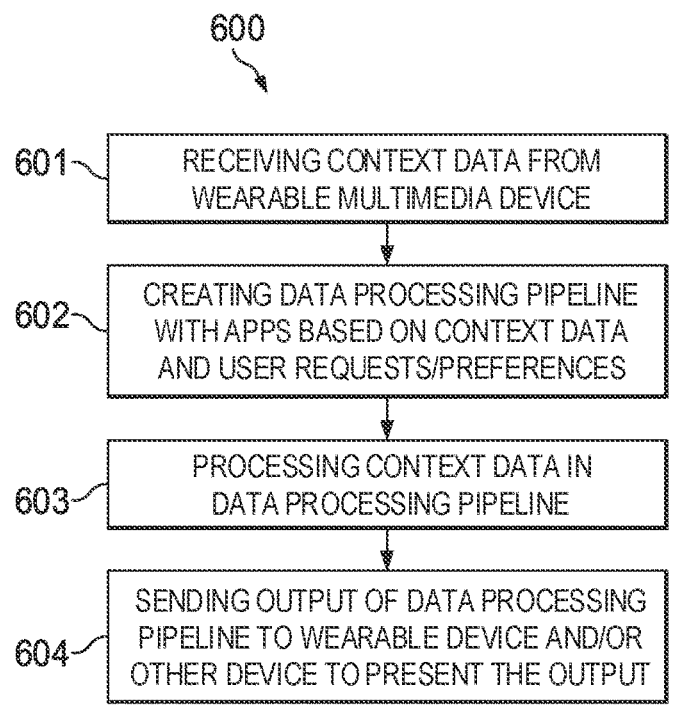
FIG. 6 is flow diagram of a data pipeline process, according to an embodiment.

FIG. 6 is flow diagram of a data pipeline process, according to an embodiment. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
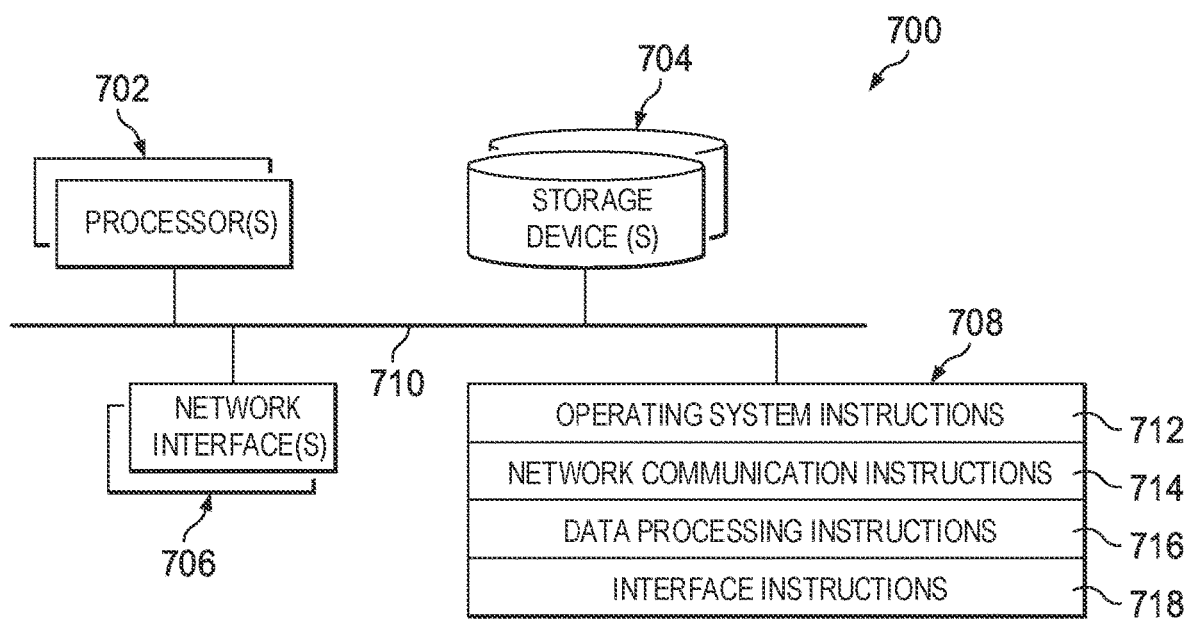
FIG. 7 is an architecture for the cloud computing platform, according to an embodiment.

FIG. 7 is an example architecture 700 for cloud computing platform 102 described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
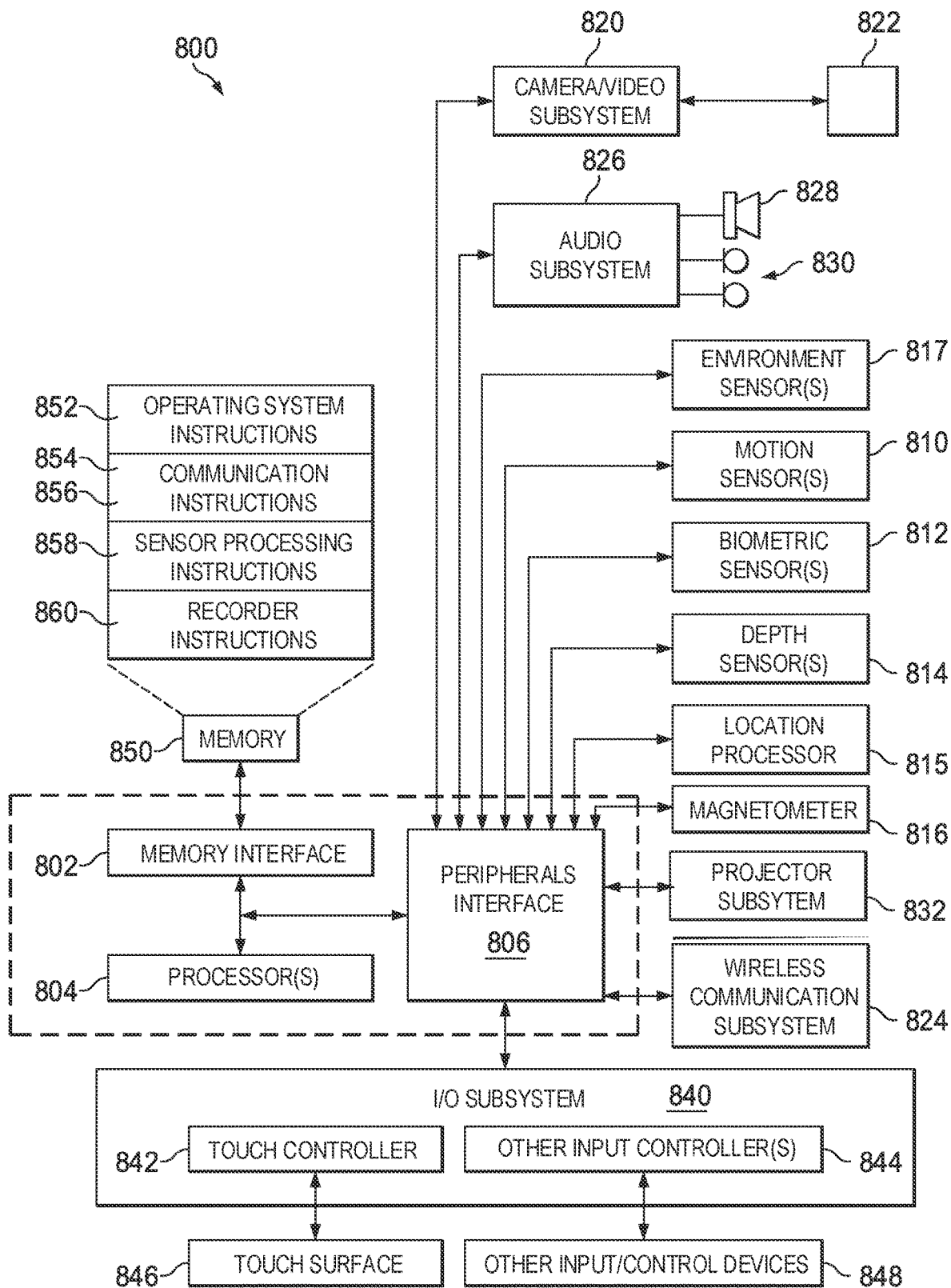
FIG. 8 is an architecture for the wearable multimedia device, according to an embodiment.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 815 (e.g., GNSS receiver chip) may be connected to peripherals interface 806 to provide geo-referencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 project light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. The wearable multimedia device can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804). Example VIs are described in further detail below.

In some implementations, device 800 plays back to a user recorded audio and/or video files (including spatial audio), such as MP3, AAC, spatial audio and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
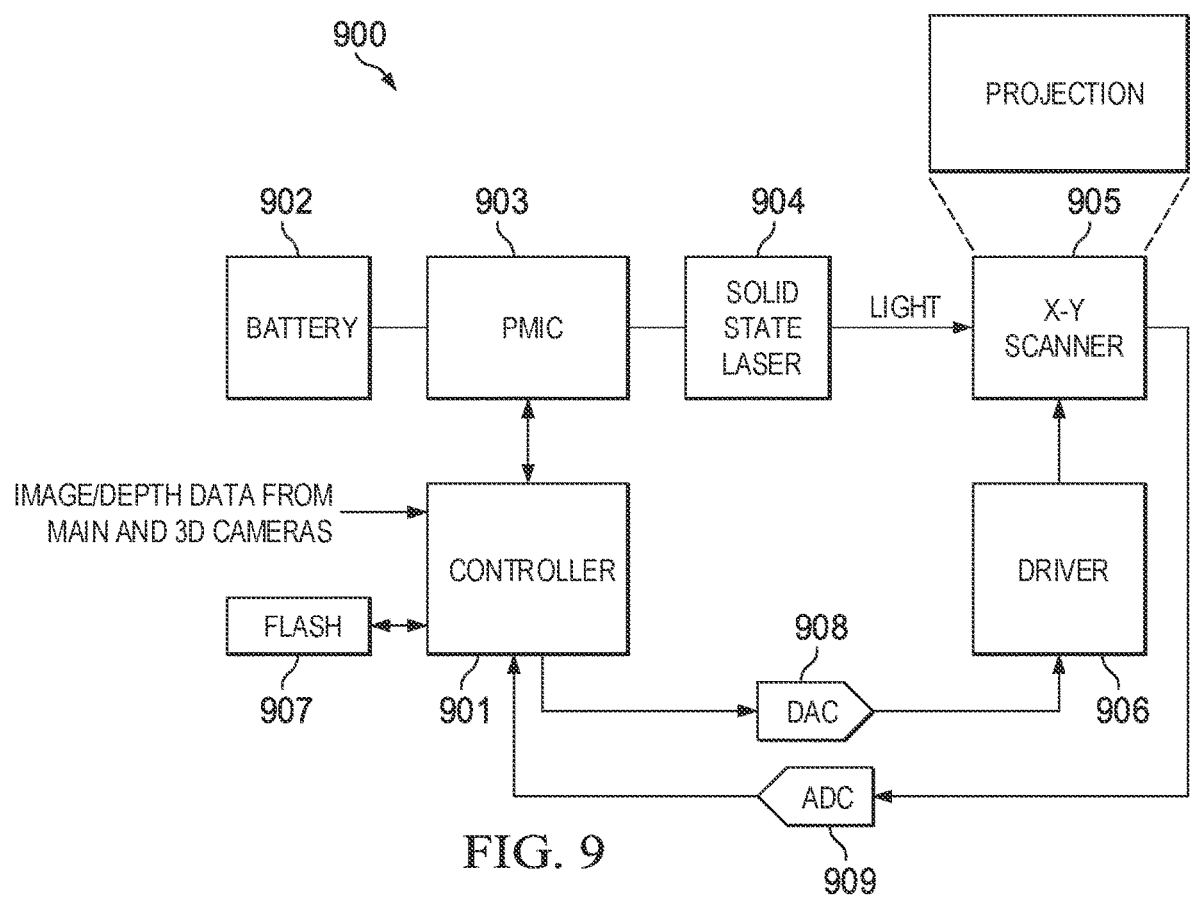
FIG. 9 is a system block diagram of a projector architecture, according to an embodiment.

FIG. 9 is a system block diagram of the projector subsystem 832, according to an embodiment. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some embodiments, separate scanners are used for the horizontal and vertical scanning directions. In other embodiments, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 905 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 1904, including turning on and shutting of solid state laser 904 and adjusting the amount of power supplied to solid state laser 904. Solid state laser 904 can be, for example, a vertical-cavity surface-emitting laser (VCSEL).

In an embodiment, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In another embodiment, the projector subsystem 832 uses a vector-graphic projection display and low-powered fixed MEMS micromirrors to conserve power. Because the projector subsystem 832 includes a depth sensor, the projected area can be masked when needed to prevent projecting on a finger/hand interacting with the laser projected image. In an embodiment, the depth sensor can also track gestures to control the input on another devices (e.g., swiping through images on a TV screen, interacting with computers, smart speakers, etc.).

In other embodiments, Liquid Crystal on Silicon (LCoS or LCOS), Digital Light Processing (DLP) or Liquid Chrystal Display (LCD) digital projection technology can be used instead of a pico-projector.

Example Virtual Interfaces

As described above, a wearable multimedia device 101 can include a projector subsystem 832 configured to present information visually to a user in the form of projected light. For example, the projector subsystem 832 can project light onto a surface (e.g., a surface of a user's hand, such as the user's palm) according to a particular spatial and/or temporal pattern, such that the user perceives a VI with one or more user interface elements. In some implementations, a VI and/or the user interface elements can include any combination of text, images, videos, colors, patterns, shapes, lines, or any other graphical information.

Further, the user can perform gestures to interact with the VI. For instance, the user can perform one or more gestures directed at one or more of the user interface elements. As examples, the user can point to a user interface element, touch or tap a user interface element using her finger (e.g., a single time, or multiple times in a sequence), perform a swiping motion along a user interface element using her finger, wave at a user interface element using her hand, hover over the user interface element, or perform any other hand or finger gesture. The wearable multimedia device 101 can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804).

At least some of the user interface elements and/or commands can be used to control the operation of the wearable multimedia device 101. For example, at least some of the user interface elements and/or commands can be used to execute or control the generation of video and/or audio content, the viewing of content, the editing of content, the storing and transmission data, and/or any other operation described herein. In some implementations, a wearable multimedia device 101 can present a VI that allows a user to view images or control a camera device as well as interact with images shown by marking them as a favorite or sharing them with one or more other users. This VI may also be referred to as a camera interface.

Figure 10:
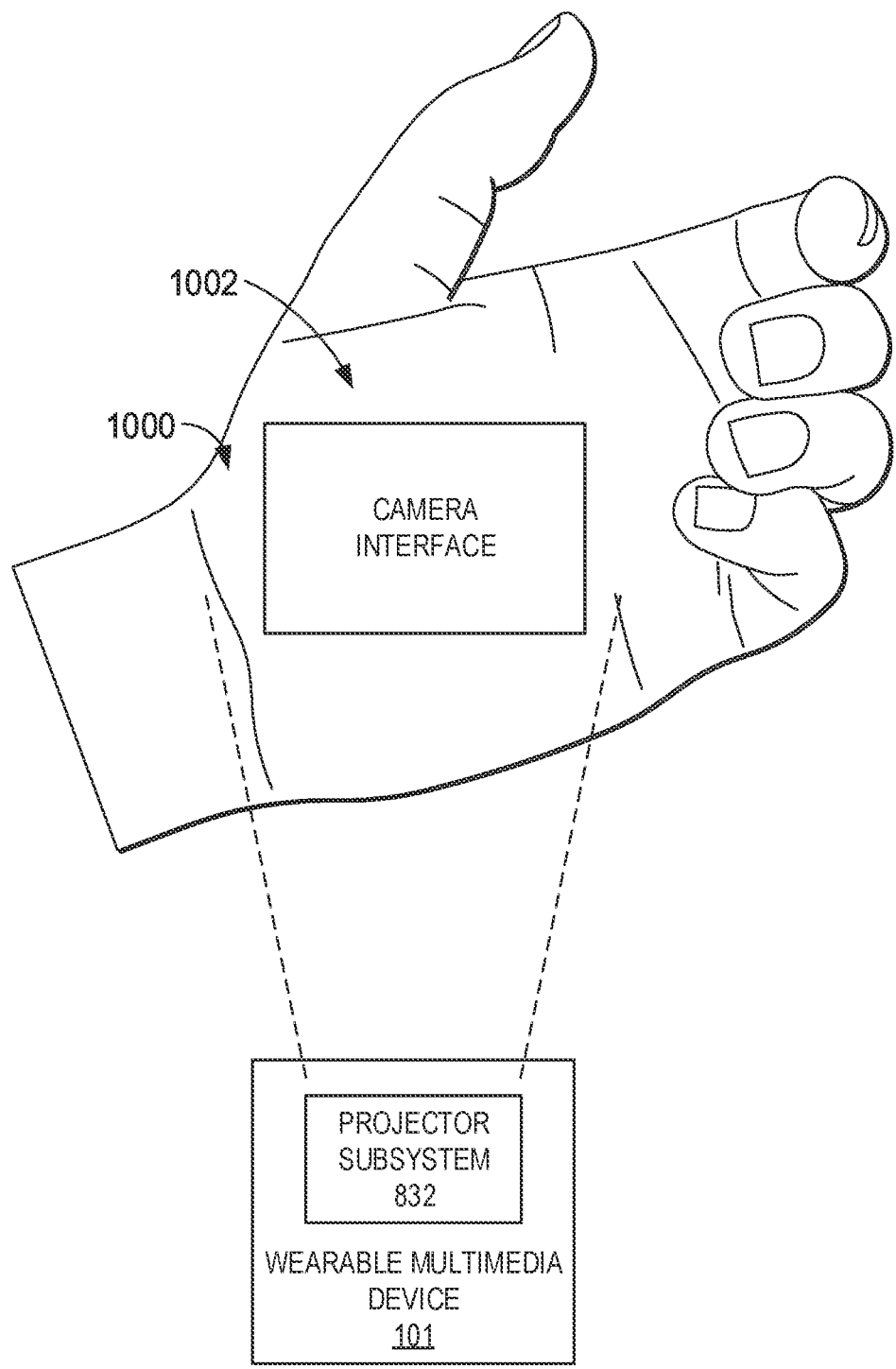
FIG. 10 is a diagram of an example virtual interface, according to an embodiment.

As an illustrative example, FIG. 10 shows a camera interface 1000 projected by a projector subsystem 832 onto a user's palm 1002. The user can interact with the camera interface 1000 to view digital content, select digital content, or control a digital image capture device of the wearable multimedia device 101.

In some implementations, the camera interface 1000 is configured to display output generated by the wearable multimedia device 101. For example, as described in FIG. 11 and FIG. 12, the wearable multimedia device 101 can determine exposure timing and parameters for a digital image capture device of the wearable multimedia device 101 to capture one or more images. The wearable multimedia device 101 can provide the one or more images to the projector subsystem 832. The projector subsystem 832 can project the camera interface 1000, including a representation of the one or more images, onto a surface, such as the user's palm 1002, the ground, wall, ceiling, or other surface.

In some implementations, the camera interface 1000 is configured to receive input from a user. For example, the user can provide input indicating a mode for image capture. Image capture modes can include modes specific to a user, based on preferences of the user learned over time, such as from tracked and stored preferences, or general modes designed to capture general features of interest based on a database of images and exposure parameters used.

Figure 11:
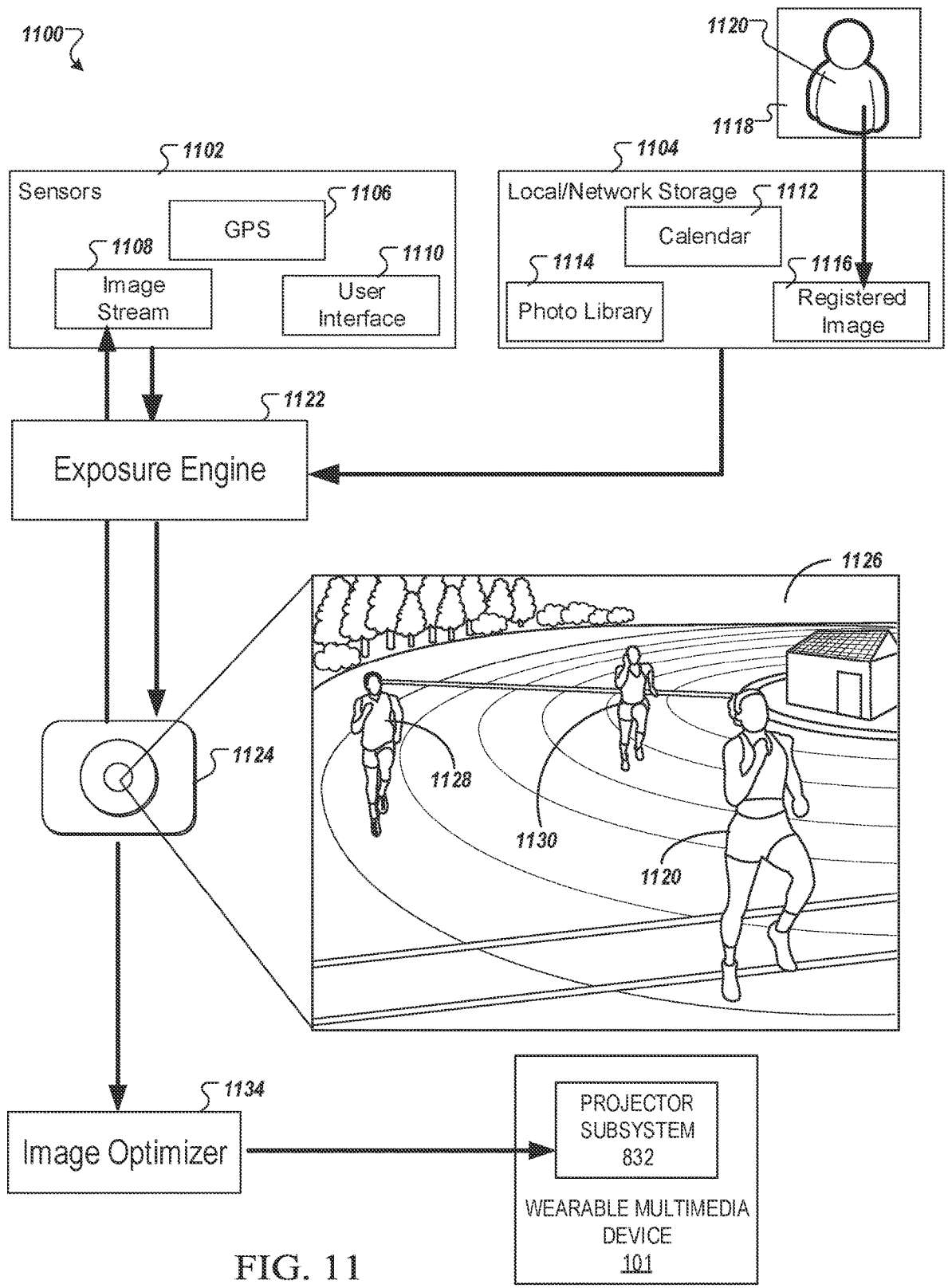
FIG. 11 is a system for determining image exposures for a camera component of a wearable multimedia device.

FIG. 11 shows an example of a system 1100 for determining image exposures for a camera component of a wearable multimedia device. The system 1100 includes sensors 1102, local/network storage 1104, an exposure engine 1122, an image capture device 1124, and an image optimizer 1134. In at least one implementation, one or more operations of the system 1100 are performed by the wearable multimedia device 101. For example, in some implementations, one or more of the sensors 1102, local/network storage 1104, exposure engine 1122, image capture device 1124, or image optimizer 1134 are operated by, or included on, the wearable multimedia device 101.

The sensors 1102 represent data streams from sensors on a device implementing the system 1100. Data streams of the sensors 1102 include data from an interface for global positioning system (GPS) 1106, an image stream 1108, and data from a user interface 1110. In some implementations, the image stream 1108 includes images captured by the image capture device 1124. In some implementations, the image stream 1108 is a buffer that is saved temporarily in storage of the wearable device 101.

In some implementations, the data streams of the sensors 1102 include data from elements of FIG. 8, such as sensors coupled with the peripherals interface 806. For example, data streams of the sensors 1102 can include data from motion sensor(s) 810, biometric sensor(s) 812, and depth sensor(s) 814, such as motion, orientation, biometric, and depth detections. The data of sensors 1102 can include data of motion sensor(s) 810 (e.g., an accelerometer, rate gyroscope), such as movement and orientation of the wearable multimedia device 101, or other device implementing the system 1100.

In some implementations, the sensors 1102 include data from the recorder 201. For example, the sensors 1102 can include video buffer 202, audio buffer 203, photo buffer 204. The data can be used by the system 1100 to determine timing of one or more exposures as well as exposure parameters. In some implementations, the sensors 1102 represents data obtained from one or more sensors.

The local/network storage 1104 includes data streams from a calendar 1112, a photo library 1114, and a registered image 1116. The calendar 1112 represents data obtained from one or more calendars accessible by the system 1100. For example, the calendar 1112 can represent data of events, including time, location, or related information, within one or more user calendars.

The photo library 1114 represents stored images. The photo library 1114 can include images from one or more user databases. The photo library 1114 can include images captured by the image capture device 1124 as well as images captured by other devices. The photo library 1114 can include a database within storage of the wearable multimedia device 101 or within a storage device communicably connected to the wearable multimedia device 101, such as a network storage device.

In some implementations, the photo library 1114 includes information about features within images. For example, the photo library 1114 can include an image of a person standing in front of a house. The photo library 1114 can include information indicating the identification of the person, the location of the house, the time and day when the image was taken, any modifications to the image, user behavior with the image, such as likes or shares, exposure parameters used to capture the image, among others.

The registered image 1116 includes data for generating an exposure. In some implementations, the registered image 1116 includes data indicating a particular object or person to be captured in an image. For example, as shown in FIG. 11, the registered image 1116 portion of the local/network storage 1104 indicates the person 1120 in the image 1118. The image 1118 can be selected by a user of the system 1100. In some implementations, the user selects through the camera interface 1002 which feature within an image or what image within a group of images, to use for the registered image 1116.

Although the sensors 1102 and the local/network storage 1104 are shown with specific elements providing data for the exposure engine 1122, in some implementations, one or more of the elements are not used, are replaced by other elements, or are combined with additional elements. For example, instead of using GPS 1106 data, the system 1100 can rely on only the image stream 1108 from a camera device, such as the image capture device 1124, and the calendar 1112 data. In general, data obtained from sensors onboard, and data stores onboard, the wearable device 101 and data obtained from communicably connected devices can be used to generate a determination of exposure timing and parameters.

The exposure engine 1122 obtains data from the sensors 1102 and the local/network storage 1104. The exposure engine 1122 determines, based on the obtained data, exposure timing and parameters for an exposure of the image capture device 1124. The exposure of the image capture device 1124 can be a first exposure as well as an exposure subsequent to one or more preceding exposures. For example, the exposure engine 1122 can determine an initial exposure setting and timing to generate images of the image stream 1108. The exposure engine 1122 can then determine subsequent exposure parameters and timing based on parsing the image stream 1108 in addition to the other data streams of the sensors 1102 and the local/network storage 1104.

In some implementations, the exposure engine 1122 determines exposure timing based on elements of an image. For example, the exposure engine 1122 can parse the image stream 1108 to determine one or more elements of one or more images, such as lighting, distance to objects, types of objects, identities of persons, among others. The exposure engine 1122 can determine, based on the one or more elements of the one or more images, whether or not to save an image within the image stream 1108.

In some implementations, the image capture device 1124 captures images provided in the image stream 1108. For example, the image capture device 1124 can receive a signal from the wearable device 101, or other device implementing the system 1100, to start capturing exposures. The captured exposures can be temporarily stored in a buffer of the image stream 1108. The buffer can be provided to the exposure engine 1122 to determine which exposure of the exposures in the stream 1108 to save to storage as well as adjustments to exposure parameters or timing.

In some implementations, the exposure engine 1122 determines when to begin collecting exposures of the image capture device 1124. For example, the exposure engine 1122 can obtain accelerometer, location, or other data from sensors 1102 of a device implementing the system 1100, such as the wearable device 101. The exposure engine 1122 can obtain data from local/network storage 1104. The exposure engine 1122 can determine when to begin collecting exposures based on one or more of: data from the sensors 1102, the data form the local/network storage 1104, a specific user preferences, general user preferences generated from a number of users of similar devices or a number of similar users, among others.

In some implementations, the exposure engine 1122 determines to start image captures of the image capture device 1124 based on data from local/network storage 1104. For example, the exposure engine 1122 can determine a calendar event indicating a track meet. The calendar event can include a location. The calendar event can include an identity of a person racing in the track meet. The exposure engine 1122 can determine, based on information of the calendar event, an identity of a person. The exposure engine 1122 can parse the photo library 1114 to find photos of the person or parse a database of features to determine what features of an image correspond to the identity of that person.

In some implementations, the exposure engine 1122 identifies the image 1118 after determining that person 1120 is associated with the calendar event. For example, the exposure engine 1122 can determine that the calendar event mentions the name of the person 1120 or the location is a known location corresponding to the person 1120, such as a school, or the person 1120 is a known person to always be captured when in view of the image capture device 1124.

In the example of FIG. 11, the exposure engine 1122 determines to trigger exposures based on comparing the location of the GPS data stream of the sensors 1102 with the location of the calendar event in the calendar data stream 1112. In some implementations, the exposure engine 1122 determines to trigger exposures based on accelerometer data streams indicating that a user is positioning a device corresponding to the image capture device 1124, such as the wearable device 101, in a position associated with image capture. The exposure engine 1122 can compare a current data stream. such as an accelerometer data stream, to one or more historical data stream, or provide one or more data streams to a trained machine learning model, to determine when to trigger exposures.

In some implementations, before triggering exposures, the exposure engine 1122 determines exposure parameters. For example, the exposure engine 1122 can determine an initial International Organization for Standardization (ISO) number, shutter speed, or aperture for the image capture device 1124, or any suitable combination of these. In some implementations, the exposure engine 1122 obtains data streams to determine what starting parameters to use. For example, the exposure engine 1122 can obtain one or more of a time of day, a light intensity value indicating a light intensity of a light detector of a device implementing the system 1100, such as the wearable device 101, among others.

In some implementations, the exposure engine 1122 compares one or more data values indicating obtained data to historical data. For example, based on a current time of day, one or more time ranges, and a comparison of the current time of day to the one or more time ranges, the exposure engine 1122 can determine a time range corresponding to a current time of day. The time range can also correspond to typical exposure parameters, e.g., lower ISO for midday and higher ISO for nighttime.

In some implementations, the exposure engine 1122 provides one or more data values indicating obtained data to a trained model. For example, the exposure engine 1122 can include a trained model or can be communicably connected to a device running a trained model. In some implementations, the trained model is a cloud server. For example, the exposure engine 1122 can be communicably connected to a cloud computing server running a trained model.

The trained model can be a type of machine learning model trained using data stream data to generate exposure settings that result in high-quality images. High-quality images can include images that are consistent with images marked by humans or automated systems as pleasing to the eye. Features can be extracted from these known high-quality images to train the model of the exposure engine 1122 to generate parameters and exposures that are likely to result in high-quality images, such as images that are not blurry, not too dark or too light, focused on persons or objects or specific objects or persons, framed such that objects are arranged spatially in a way consistent with images marked as high-quality, among others.

In some implementations, the image optimizer 1134 optimizes one or more obtained images. For example, the image optimizer 1134 can obtain one or more images from the image capture device 1124 based on the exposure parameters and timing of the exposure engine 1122. The image optimizer 1134 can include one or more trained models to generate one or more high-quality images based on the obtained one or more images. In some implementations, the image optimizer 1134 selects one or more images from an obtained set of one or more images. For example, the image optimizer 1134 can provide one or more obtained images to one or more trained models. The one or more trained models can be trained to determine high-quality images based on ground truth data indicating images marked as high-quality by a human or automated process. The one or more trained models can generate output indicating a top one or more images that most closely represent the features associated with known high-quality images, such as non-blurry objects, correct lighting, among others.

In some implementations, the image optimizer 1134 generates at least one image based on an obtained set of one or more images. For example, the image optimizer 1134 can combine one or more obtained images to generate a high-quality image. In some cases, the image optimizer 1134 is configured to provide one or more obtained images to a trained model. The model can be trained to generate one or more images of high-quality based on an obtained set of one or more images. As discussed herein, the model can be trained with ground truth data indicating images marked as high-quality by a user or automated process. The model can combine elements of multiple images to create a composite image.

In some implementations, the model determines regions of the one or more obtained images that correspond to a high-quality image and combines those regions into a composite image for output. The model can also process the one or more obtained images or the generated composite image and perform adjustments in order to generate a final image that represents features of a high-quality image. Adjustments may include interpolating to increase resolution, cropping, color balancing, lighting effects, among others. In some cases, the model determines that the high-quality image features of a final image satisfies a threshold indicating an image of sufficient quality for capture, storage, or viewing on the wearable device 101.

In some implementations, the exposure engine 1122 obtains output from a trained model. As discussed, the exposure engine 1122 can provide data to a trained model. The trained model can provide output to the exposure engine 1122 indicating one or more parameters or timing for image captures. For example, based on providing data, including a time of day, a location, and a person of interest, the trained model can provide output indicating exposure parameters, including ISO, shutter speed, and aperture as well as timing of exposures. Timing can include a frequency to obtain images. In some cases, a trained model can detect features, such as the person 1120, in image data, such as the image stream 1108, provided as input by the image capture device 1124, and determine the timing of exposure as a time when the person 1120 is represented in the image data.

In some implementations, the exposure engine 1122 obtains data from other data streams. For example, the exposure engine 1122 can obtain data from a weather data stream indicating weather for one or more locations. Based on a current location, the exposure engine 1122 can determine a current weather condition. The exposure engine 1122 can provide the current weather condition to a trained model as discussed herein, or compare the data to historical data, to determine exposure parameters. For example, a weather forecast or current conditions indicating a cloudy day may result in determined exposure parameters to include a higher ISO.

In some implementations, the exposure engine 1122 uses multiple modes based on variables of scenario. For example, the exposure engine 1122 can determine that network connection is off. The exposure engine 1122 can process data streams offline and determine exposure timing and parameters without using network resources. In some implementations, offline processing includes comparing obtained data to historical data. In some implementations, offline processing includes providing data to an offline implementation of a machine learning model. In some implementations, offline processing includes not providing data to an online implementation of a machine learning model running, at least in part, on a device communicably connected to a device implementing the system 1100, such as the wearable device 101.

In some implementations, the exposure engine 1122 detects a partial gesture of a user. For example, a user may raise a hand, or perform another gesture, associated with taking a picture with the image capture device 1124. The gesture can be configured to open a camera application or to trigger a camera exposure. The exposure engine 1122 can detect a beginning of the gesture and trigger an exposure before the gesture is complete such that, when, or after, the gesture is complete and a camera function of an associated camera application is performed, the exposure engine 1122 has determined correct exposure parameters for a scene. In this way, the system 1100, and the exposure engine 1122, can increase the efficiency of image capture by preemptively optimizing parameters based on one or more data streams of the sensors 1102 and the storage 1104.

In some implementations, the wearable device 101 is worn on a user facing the direction that the user is facing. For example, as shown in FIG. 11, the image capture device 1124 captures image 1126 at a place and time, in this case, a track meet. Before capturing the image 1126, the exposure engine 1122 provides data to the image capture device 1124 indicating exposure parameters. The exposure engine 1122 determines that the user is at a track meet based on the calendar data stream 1112 and the GPS data stream 1106. The exposure engine 1122 also determines the person 1120 is a person of interest.

In some implementations, the image capture device 1124 provides images to the image stream 1108. For example, the exposure engine 1122 can obtain images as they are captured by the image capture device 1124 and stored in a buffer of the image stream 1108. The exposure engine 1122 can determine, based on the image stream 1108, adjustments to the exposure parameters of the image capture device 1124. The exposure engine 1122 can determine, based on the data streams of the sensors 1102 and storage 1104, what parameters, or region of values of parameters, will likely result in a high-quality image as discussed herein.

In some implementations, the exposure engine 1122 tunes exposure parameters based on current data provided by a camera device. For example, the exposure engine 1122 can tune the exposure parameters of the image capture device 1124 based on the image stream 1108. In some implementations, the exposure engine 1122 provides data based on data of the image stream 1108, to a trained model. In some implementations, the model is trained to determine if an image is high-quality. For example, the model can extract features of images in the image stream 1108 and determine, based on the extracted features, and compared to historical training data indicating features associated with high-quality images, such as images that are in focus, aligned, correctly lighted, among others, and features associated with low quality images, such as images that are blurry, too dark, too bright, misaligned, or have poor object arrangement within the scene.

In some implementations, the image 1126 is generated by the exposure engine 1122 based on the data provided by the image capture device 1124. For example, the exposure engine 1122 can select the image 1126 from a buffer of images obtained by the image capture device 1124 based on one or more processes. In some implementations, one or more processes include processing of a trained model. For example, the exposure engine 1122 can provide one or more images of the image stream 1108 with one or more items of data from the data streams 1102 and 1104 to a trained model. The trained model can provide output indicating whether or not a given image is of high-quality or whether or not an image should be saved or provided to a user for viewing.

In some implementations, the image optimizer 1134 obtains the image 1126. For example, the image optimizer 1134 can obtain the image 1126 from the image capture device 1124 as well as the exposure engine 1122. In some implementations, operations of the image optimizer 1134 are performed on a device communicably connected to a device implementing the system 1100. In some implementations, operations of the image optimizer 1134 are performed on a device implementing the system 1100. In some implementations, the image optimizer 1134 performs one or more adjustments on the obtained image 1126. For example, the image optimizer 1134 can detect the person 1120 and crop the image 1126 to focus on that person 1120. The image optimizer 1134 can crop out other persons, such as person 1128, and defocus other persons, such as 1130, to generate an image that only includes the person 1120. The image optimizer 1134 can combine multiple exposures to improve the dynamic range or other features of a final composite image.

In some implementations, the exposure engine 1122 learns exposure timing based on context of a scene. For example, in the track meet depicted in the image 1126, the person 1120 is running around a track. The exposure engine 1122 can determine the frequency of the person 1120 approaching the same region of the track based on repeated sightings of the person 1120 as they run around the track. The exposure engine 1122 can change exposures such that the frequency of captures increases when the person 1120 is expected, based on rate and frequency, to be at the region of the track in view of the wearable device 101.

In some implementations, the exposure engine 1122 obtains historical data to determine a frequency of captures. For example, the exposure engine 1122 can obtain data of the rate of the person 1120 and determine that the rate corresponds to a frequency indicating when the person 1120 will be in view at the portion of track in view of the wearable device 101. The exposure engine 1122 can send a signal to the image capture device 1124 configured to increase image captures when the person 1120 is expected to be in view of the image capture device 1124. The exposure engine 1122 can send a signal to the image capture device 1124 configured to decrease image captures when the person 1120 is not expected to be in view of the image capture device 1124.

In some implementations, the exposure engine 1122 obtains images from the image stream 1108 and determines a level of movement in a scene. For example, the exposure engine 1122 can compare a first image in the image stream 1108 and a subsequent image in the image stream 1108 and determine a different amount between the images. If the difference amount, indicating a difference in the positions of objects or pixel values, satisfies a threshold, the exposure engine 1122 can send a signal to the image capture device 1124 configured to increase image captures in order to capture the movement. In the track scene, this can result in images captured when runners are in view and therefore generating significant differences in a subsequent image stored in the image stream 1108.

In other scenes, such as views of an animal, birthday parties, dashboard camera footage, among others, the exposure engine 1122 can be configured to increase image captures of the image capture device 1124 to coincide with higher levels of movement. Because higher level of movement typically coincides with interesting or noteworthy events, the system 1100, by adjusting the timing of exposures to increase during periods of increased movement, efficiently captures the interesting or noteworthy events in view of the wearable device 101 while minimizing storage and processing power by reducing image captures during periods of decreased movement. In some implementations, increased and decreased movement is determined in comparison to an average level of movement in a scene over a period of time.

After capturing images, the image capture device 1124 or the exposure engine 1122 can provide the images to the image optimizer 1134. The image optimizer generates optimized versions of one or more obtained images. The optimized versions can include post-processing adjustments, such as adjustments to lighting, cropping, color, focus, among others. In some implementations, the image optimizer 1134 provides images for display and selects images for storage. For example, the image optimizer 1134 can determine one or more images are of high-quality or one or more composite images are of high-quality. The images of high-quality, as discussed herein, can be stored or provided for viewing. Images not selected or images that were used to generate a composite image, can be removed from storage. In this way, the system 1100 enables capture of many images while minimizing the storage and processing impact associated with storing all of those images in non-temporary storage.

In some implementations, the system 1100 provides images captured by the image capture device for storage. For example, the image capture device 1124 can generate a plurality of images at the track meet, or any other event or scene. The system 1100 can include an interface with a server storage device or an onboard storage device. The images captured over a past time period, such as a day, hour, or length of an event, such as an event indicated in a calendar, can be stored at a higher resolution. For example, all images captured over that period of time can be stored, at least temporarily, to provide a user with a chance to review the saved images, such as the images optimized by the image optimizer 1134, and make sure that the system 1100 did not miss any important events. After the period of time, the system 1100, or connected storage device, can remove the image data from storage.

Final images generated by the image optimizer 1134 are provided for display or storage. In the example of FIG. 11, the image optimizer 1134 provides an optimized version of the image 1126 to the projector subsystem 832 of the wearable device. As discussed in FIG. 10, the projector subsystem 832 can project an optimized version of the image 1126 onto a surface for viewing by a user of the system 1100. In some implementations, the image optimizer 1134 provides an optimized version of the image 1126 to another device for viewing. For example, the image optimizer 1134 can provide an optimized version of the image 1126 to a smartphone, laptop, or desktop computer for viewing on an LCD, LED, OLED, or other form of traditional screen.

Figure 12:
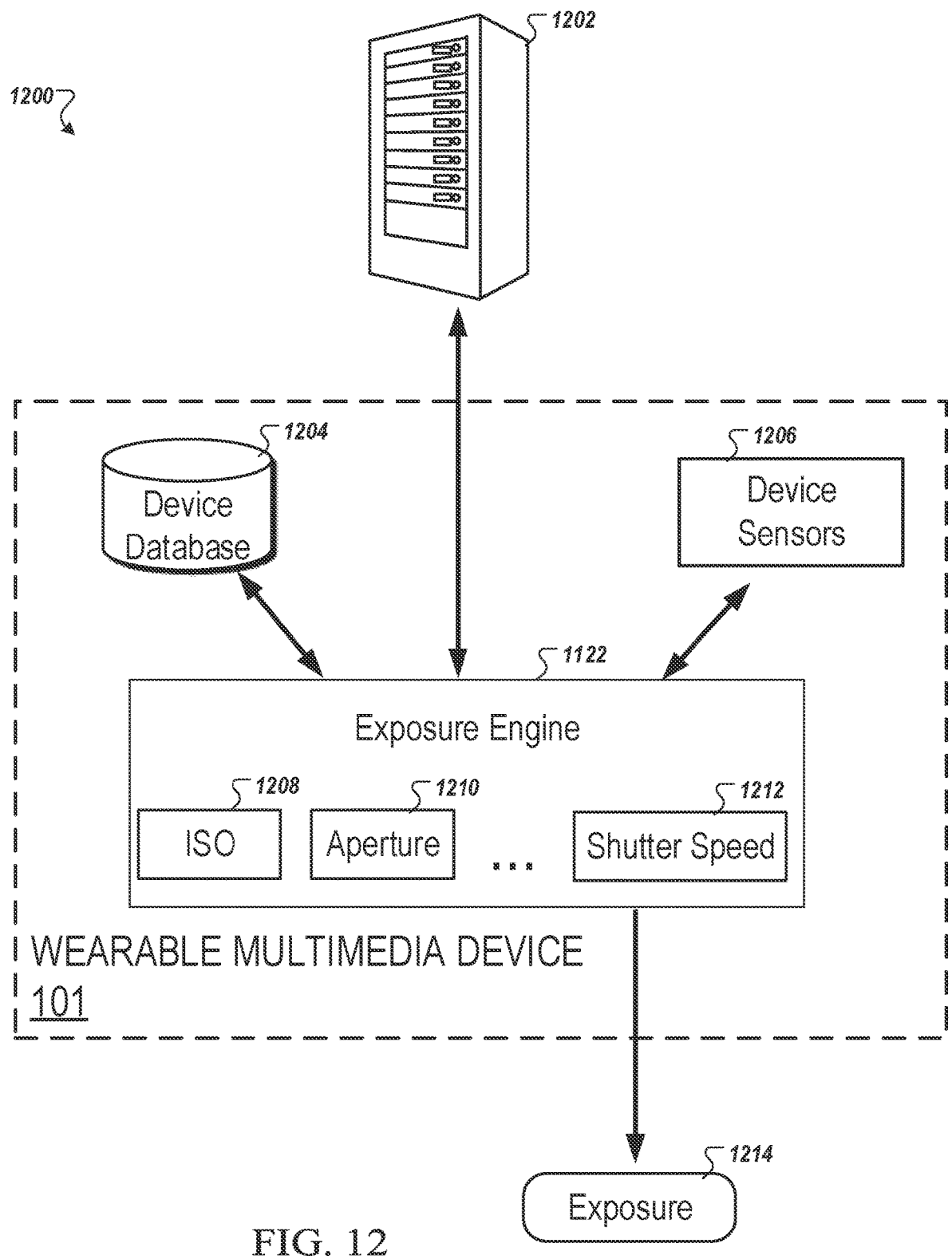
FIG. 12 is a system for determining exposure parameters and generating an image exposure.

FIG. 12 shows an example of a system 1200 for determining exposure parameters and generating an image exposure. As shown, the system 1200 includes the wearable device 101 and a network server 1202. The wearable device 101 includes a device database 1204, device sensors 1206, and the exposure engine 1122. The exposure engine 1122 controls, in part, one or more of exposure parameters ISO 1208, aperture 1210, and shutter speed 1212, for generating the exposure 1214. An example exposure generated based on exposure parameters of the exposure engine 1122 is shown as image 1126 in FIG. 11.

The network server 1202 provides a database including data, such as calendar event data, data from cloud computing, cloud computing machine-learning models, user profile data, data from internet, data from a user's online databases, such as online image libraries, among others. The wearable device 101 obtains data provided by the network server 1202. In particular, the exposure engine 1122 obtains data from the network server 1202 to determine exposure parameters and timing of exposures as discussed in reference to FIG. 11.

The device database 1204 and the device sensors 1206 provide additional data to the exposure engine 1122 to determine one or more exposure parameters or exposure timings. In some implementations, the exposure engine 1122 obtains data from the device database 1204 and the device sensors 1206 and provides the data to the network server 1202 for processing. The exposure engine 1122 can then obtain output from the network server 1202 indicating a result of the processing. For example, the exposure engine 1122 can provide data from the device database 1204 and the device sensors 1206, as well as data stored in databases connected to the network server 1202, to the network server 1202. The network server 1202 can provide the data to one or more cloud computing architectures, including one or more trained models. The exposure engine 1122 can then obtain output from the cloud computing systems to determine one or more exposure parameters or timing.

In the example of FIG. 12, the exposure engine 1122 obtains data from the device database 1204, the device sensors 1206, and the network server 1202. In some implementations, the exposure engine 1122 processes the data onboard using onboard algorithms or trained models. In some implementations, the exposure engine 1122 processes the data using cloud computing provided by a connection to the network server 1202. Based on the processing, the exposure engine 1122 determines one or more exposure parameters. Exposure parameters include ISO 1208, aperture 1210, and shutter speed 1212. The exposure engine 1122 applies the exposure parameters to a camera device, such as the image capture device 1124.

In some implementations, the exposure engine 1122 uses an interface of the wearable device 101 to apply the exposure parameters to a camera device. For example, the wearable device 101 can be configured to control the image capture device 1124. The exposure engine 1122 can provide the exposure parameters and timing to the interface of the wearable device 101 with the image capture device 1124. The wearable device 101 can then apply the exposure parameters and timing generated by the exposure engine 1122 to the image capture device 1124.

After the exposure engine 1122 determines exposure parameters and timing for one or more exposures, the exposure 1214 can be generated. The exposure 1214 can result in an image, such as an image captured by the image capture device 1124.

In some implementations, the exposure engine 1122 is operated by the network server 1202. For example, the wearable device 101 can establish a connection with the network server 1202. The wearable device 101 can provide data corresponding to the device database 1204, such as captured image data, stored information, among others, as well as data from the device sensors 1206 to the network server 1202. The exposure engine 1122 can operate on the network server 1202 and generate exposure parameters and timings. As discussed herein, the exposure engine 1122 can process the data, including data from network databases connected to the network server 1202, using algorithms and trained models. The exposure engine 1122 can then generate the exposure parameters and timing and provide them to the wearable device 101. In some implementations, the exposure engine 1122 provides the exposure parameters and timing to the network server 1202. For example, the network server 1202 can obtain the exposure parameters and timing and provide the exposure parameters and timing to the wearable device 101. The wearable device 101 can then, as discussed, control a camera device, such as the image capture device 1124, to apply the exposure parameters and generate the exposure 1214.

In some implementations, the exposure engine 1122 determines exposure parameters based on a classification of a scene. For example, when the exposure engine 1122 detects a fast-moving object, such as a dog running, the exposure engine 1122 can increase shutter speed. Other context models, such as birthday candles, can be applied to multiple devices based on a determination that a scene includes features consistent with one or more existing context models. The context models can be trained to provide the appropriate exposure parameters and exposure timing for the particular scene. In general, multiple context models can be stored on a device or in a network server, such as the network server 1202, and applied when the exposure engine 1122 is processing data. During processing, the exposure engine 1122 can apply a context model to determine the exposure parameters for a particular scene.

As one illustrative example, the wearable device 101 can be used on a whale watching tour. In this case, the exposure engine 1122 can include a context model for whale watching. The context model can detect changes in an image stream, such as the image stream 1108, that indicate a whale breaching the surface. The context model can be tuned to be sensitive to particular features, such as an appearance of white water or foam within a body of water that typically indicates a breach. In this way, context models can be fine-tuned, either by a user of the system or programmatically by determining a similarity of multiple captured images and associated exposure parameters corresponding to high-quality images. That is, data from multiple devices can be combined to determine what exposure parameters and timing work best in certain scenarios. In some implementations, this data is captured in the training of a model where the model recognizes a context based on obtained data and generates a set of exposure parameters consistent with high-quality images previously obtained in similar contexts.

In some implementations, the exposure engine 1122 obtains previous exposure parameter data. For example, a user can select an object or subject displayed on the camera interface 1002. The exposure engine 1122 can generate exposure parameters to focus on that object or subject and adjust ISO, aperture, and shutter speed, to clearly capture that subject or object based on the lighting conditions and movement of the subject or object. A system, such as the system 1200 can record the exposure parameters corresponding to the object or subject for later use. For example, the exposure engine 1122 can identify, based on data from the image stream 1108, a person previously selected. The person can have associated exposure parameters. The exposure engine 1122 can query for exposure parameters corresponding to the person based on identifying the person in an image of the image stream 1108.

In some implementations, the exposure engine obtains exposure patterns recorded for a subject or object. For example, the exposure engine 1122 can obtain exposure parameters previously recorded for a particular person. The exposure engine 1122 can apply the exposure parameters to the image capture device 1124 for subsequent image captures. In this way, a person or object can be focused on when in view of the image capture device 1124. The person or object can leave the view. When the person or object reenters the view some time later, the exposure engine 1122 can identify and apply one or more values corresponding to previously applied exposure parameters.

Additional Example Processes

Figure 13:
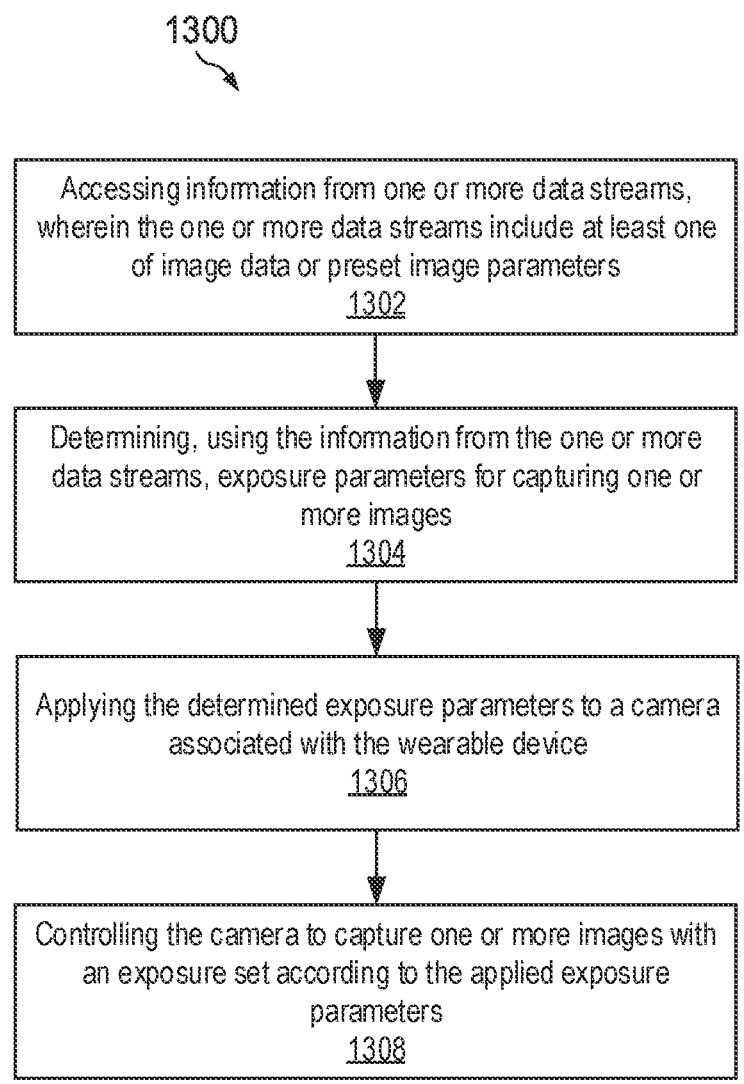
FIG. 13 is flow diagram of a process for generating image exposures based on determined exposure parameters.

FIG. 13 is flow diagram of an example process 1300 for generating image exposures based on determined exposure parameters. In some implementations, process 1300 is implemented using wearable multimedia devices 101 described in reference to FIGS. 1-9.

The process 1300 includes accessing information from one or more data streams, where the one or more data streams include at least one of image data or preset image parameters (1302). For example, as shown in FIG. 11, the image capture device 1124, such as a camera of the wearable device 101, can obtain data from the sensors 1102 and local/network storage 1104. The data from the sensors 1102 and local/network storage 1104 can include data from a GPS 1106, image stream 1108, user interface 1110, such as the camera interface 1002, calendar data 1112, photo library 1114, and a registered image 1116.

The process 1300 includes determining, using the information from the one or more data streams, exposure parameters for capturing one or more images (1304). For example, the exposure engine 1122 can determine, based on the data from the sensors 1102 and local/network storage 1104, exposure patterns for the image capture device 1124, such as a camera of the wearable device 101.

The process 1300 includes applying the determined exposure parameters to a camera associated with the wearable device (1306). For example, the exposure engine 1122 can provide determined exposure parameters, based on the data from the sensors 1102 and local/network storage 1104, to the image capture device 1124 or controlling device, such as the wearable device 101.

The process 1300 includes controlling the camera to capture one or more images with an exposure set according to the applied exposure parameters (1308). For example, the image capture device 1124 can capture the image 1126 based on the exposure parameters provided by the exposure engine 1122. The exposure engine 1122 can send a control signal directly to the image capture device 1124 for capturing the image 1126. The exposure engine 1122 can send a control signal to the wearable device 101 configured to control the image capture device 1124 to capture the image 1126.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
accessing, at a wearable device, preset image parameters available to the wearable device, wherein the preset image parameters are generated based on at least one of (i) a context of the wearable device that is determined using one or more sensors, (ii) calendar information, or (iii) location information;
determining, using information corresponding to the preset image parameters, exposure parameters for capturing one or more images;
applying the determined exposure parameters to a camera associated with the wearable device; and
controlling the camera to capture the one or more images with an exposure set according to the applied exposure parameters.

2. The method of claim 1, wherein accessing the preset image parameters comprises accessing the preset image parameters in response to:
receiving an input to take pictures using the camera; or
predicting, based on the context of the wearable device determined using the one or more sensors, that the camera will be activated to take pictures.

3. The method of claim 1, wherein determining the exposure parameters comprises:
adjusting the preset image parameters based on a target feature determined from one or more data streams accessed at the wearable device.

4. The method of claim 1, comprising:
identifying a feature within one or more data streams accessed at the wearable device, wherein the feature includes at least one of a representation of a specific person or a representation of a specific object; and
detecting the feature within image data captured by the wearable device.

5. The method of claim 4, comprising:
controlling the camera to adjust one or more lenses to focus on the feature.

6. The method of claim 4, comprising:
controlling the camera to capture the feature within the one or more images.

7. The method of claim 6, comprising:
controlling the camera to capture the feature within one or more additional images with the exposure set according to an adjusted version of the applied exposure parameters.

8. The method of claim 1, comprising:
accessing, at the wearable device, at least one of the calendar information, the location information, or stored image data; and
determining, using at least one of the calendar information, the location information, or the stored image data, the exposure parameters for capturing the one or more images.

9. The method of claim 1, comprising:
receiving, at the wearable device, information from one or more data streams that include image data captured by the one or more sensors; and
in response to receiving the information from the one or more data streams, activating the camera, wherein the activating comprises applying the determined exposure parameters.

10. The method of claim 9, wherein determining the exposure parameters comprises determining the exposure parameters further using the information from the one or more data streams.

11. The method of claim 1, further comprising:
providing a camera interface associated with the camera, the camera interface enabling a user to view digital content, select digital content, or provide input for taking pictures using the camera.

12. The method of claim 1, further comprising:
projecting, using the wearable device, an image of the one or more images on a display surface corresponding to the wearable device, the display surface being physically detached from the wearable device.

13. The method of claim 12, further providing the display surface on one of a surface of a hand of a user, a palm of a user, a wrist of a user, a tabletop, a wall, a portion of glass, or a portion of ground.

14. The method of claim 12, wherein projecting, using the wearable device, the image of the one or more images on the display surface corresponding to the wearable device comprises:
presenting an image of the one or more images on the display surface corresponding to the wearable device using one of a laser projector of the wearable device, Liquid Crystal on Silicon (LCOS) technology, Digital Light Processing (DLP) technology, Liquid Chrystal Display (LCD) technology, or an external projector that is coupled to the wearable device.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
accessing, at a wearable device, preset image parameters available to the wearable device, wherein the preset image parameters are generated based on at least one of (i) a context of the wearable device that is determined using one or more sensors, (ii) calendar information, or (iii) location information;
determining, using information corresponding to the preset image parameters, exposure parameters for capturing one or more images;
applying the determined exposure parameters to a camera associated with the wearable device; and
controlling the camera to capture the one or more images with an exposure set according to the applied exposure parameters.

16. The system of claim 15, wherein accessing the preset image parameters comprises accessing the preset image parameters in response to:
   receiving an input to take pictures using the camera; or
   predicting, based on the context of the wearable device determined using the one or more sensors, that the camera will be activated to take pictures.

17. The system of claim 15, wherein determining the exposure parameters comprises:
   adjusting the preset image parameters based on a target feature determined from one or more data streams accessed at the wearable device.

18. The system of claim 15, the operations comprising:
   identifying a feature within one or more data streams accessed at the wearable device, wherein the feature includes at least one of a representation of a specific person or a representation of a specific object; and
   detecting the feature within image data captured by the wearable device.

19. The system of claim 18, the operations comprising:
   controlling the camera to adjust one or more lenses to focus on the feature.

20. The system of claim 18, the operations comprising:
   controlling the camera to capture the feature within one or more additional images with the exposure set according to an adjusted version of the applied exposure parameters.

21. One or more non-transitory computer-readable media storing instructions that, when executed by at least one processor, cause the at least one processor to perform operations comprising:
   accessing, at a wearable device, preset image parameters available to the wearable device, wherein the preset image parameters are generated based on at least one of (i) a context of the wearable device that is determined using one or more sensors, (ii) calendar information, or (iii) location information;
   determining, using information corresponding to the preset image parameters, exposure parameters for capturing one or more images;
   applying the determined exposure parameters to a camera associated with the wearable device; and
   controlling the camera to capture the one or more images with an exposure set according to the applied exposure parameters.

* * * * *